(12) United States Patent
Zhou et al.

(10) Patent No.: US 11,260,837 B2
(45) Date of Patent: Mar. 1, 2022

(54) CONTROLLER AND METHOD OF CONTROLLING TRAILER SERVICE BRAKING

(71) Applicant: Bendix Commercial Vehicle Systems LLC, Elyria, OH (US)

(72) Inventors: Nianqing Zhou, Avon, OH (US); Aaron TenHuisen, Cleveland, OH (US); Thomas J Hayes, Lakewood, OH (US); Ana Karen González Gutiérrez, Monterrey (MX)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 264 days.

(21) Appl. No.: 16/797,709

(22) Filed: Feb. 21, 2020

(65) Prior Publication Data

US 2021/0261105 A1 Aug. 26, 2021

(51) Int. Cl.
*B60T 8/17* (2006.01)
*B60T 17/22* (2006.01)
*B60Q 5/00* (2006.01)
*B60Q 9/00* (2006.01)

(52) U.S. Cl.
CPC ............ *B60T 8/1708* (2013.01); *B60Q 5/005* (2013.01); *B60Q 9/00* (2013.01); *B60T 17/221* (2013.01)

(58) Field of Classification Search
None
See application file for complete search history.

(56) References Cited

U.S. PATENT DOCUMENTS

| 8,127,600 | B2 | 3/2012 | Olson |
| 9,802,587 | B2* | 10/2017 | Morselli ............... B60T 8/1708 |
| 9,821,779 | B2* | 11/2017 | Grandstaff ............ B60T 13/683 |
| 10,207,687 | B1 | 2/2019 | Shimizu |
| 2018/0015873 | A1 | 1/2018 | Brubaker |

FOREIGN PATENT DOCUMENTS

WO 2017026968 A2 2/2017

* cited by examiner

*Primary Examiner* — Todd Melton
(74) *Attorney, Agent, or Firm* — Cheryl Greenly; Brian Kondas; Eugene Clair

(57) ABSTRACT

A tractor controller for controlling trailer brake applications comprises an input for receiving a signal indicative of a trailer brake application and control logic. The control logic receives a signal indicating a trailer brake application is requested, compares the trailer brake signal to a predetermined signal profile, applies the trailer service brakes in response to the trailer brake signal meeting the signal profile and compares a duration of the trailer brake signal to first predetermined time. A warning is provided in response to the duration of the trailer brake signal being greater than a first predetermined time and the control logic discontinues the trailer service brake application in response to duration of trailer brake signal being greater than the second predetermined time.

10 Claims, 4 Drawing Sheets

CONTROLLER AND METHOD OF CONTROLLING TRAILER SERVICE BRAKING

BACKGROUND

The present invention relates to embodiments of a controller and method for controlling trailer service brake applications. In a tractor-trailer commercial vehicle, the driver of the vehicle actuates the foot brake pedal to apply the service brakes on both the tractor and the trailer. If the driver desires to apply only the service brakes on the trailer, he can actuate a manually operable lever in the cab of the tractor. When he actuates this lever, a pneumatic signal is applied through a trailer brake control valve to the service brakes of the trailer, but the service brakes of the tractor remain released. Application of the trailer service brakes alone is not intended to replace a full vehicle service brake application that occurs when the driver uses the foot brake pedal.

Electronic devices can be used in place of pneumatic only trailer control valves and still include a manually operable lever or switch in the cab. However, the electronic devices can be misused by the driver to actuate only the trailer service brakes when instead both the tractor and trailer service brakes should be applied. There is a need to monitor the actuation of the trailer service brakes by the manual device to ensure the driver is not using the trailer service brakes to the detriment of the overall vehicle braking system.

SUMMARY

Various embodiments of a tractor controller for controlling trailer brake applications comprise an input for receiving a signal indicative of a trailer brake application and control logic. The control logic receives a signal indicating a trailer brake application is requested, compares the trailer brake signal to a predetermined signal profile, applies the trailer service brakes in response to the trailer brake signal meeting the signal profile and compares a duration of the trailer brake signal to a first predetermined time. A warning is provided in response to the duration of the trailer brake signal being greater than a first predetermined time and the control logic discontinues the trailer service brake application in response to duration of trailer brake signal being greater than a second predetermined time.

In accordance with another aspect, a method for controlling trailer brake applications comprises receiving a signal indicative of a trailer brake application request at a tractor controller, comparing the trailer brake signal to a plausible signal profile and applying the trailer service brakes in response to the trailer brake signal meeting the plausible signal profile. The method also includes comparing a duration of the trailer brake signal to first predetermined time and discontinuing the trailer service brake application in response to duration of trailer brake signal being greater than a second predetermined time.

In accordance with yet another aspect, a system for controlling trailer brake applications comprises an electronic trailer hand control device and a tractor controller. The tractor controller includes an input for receiving a signal from the electronic trailer hand control device and control logic. The control logic receives a signal indicating a trailer brake application is requested, compares the trailer brake signal to a predetermined unintended signal profile and applies the trailer service brakes in response to the trailer brake signal being different than the unintended signal profile. The control logic then compares a duration of the trailer brake signal to first predetermined time and discontinues the trailer service brake application in response to duration of trailer brake signal being greater than a second predetermined time.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
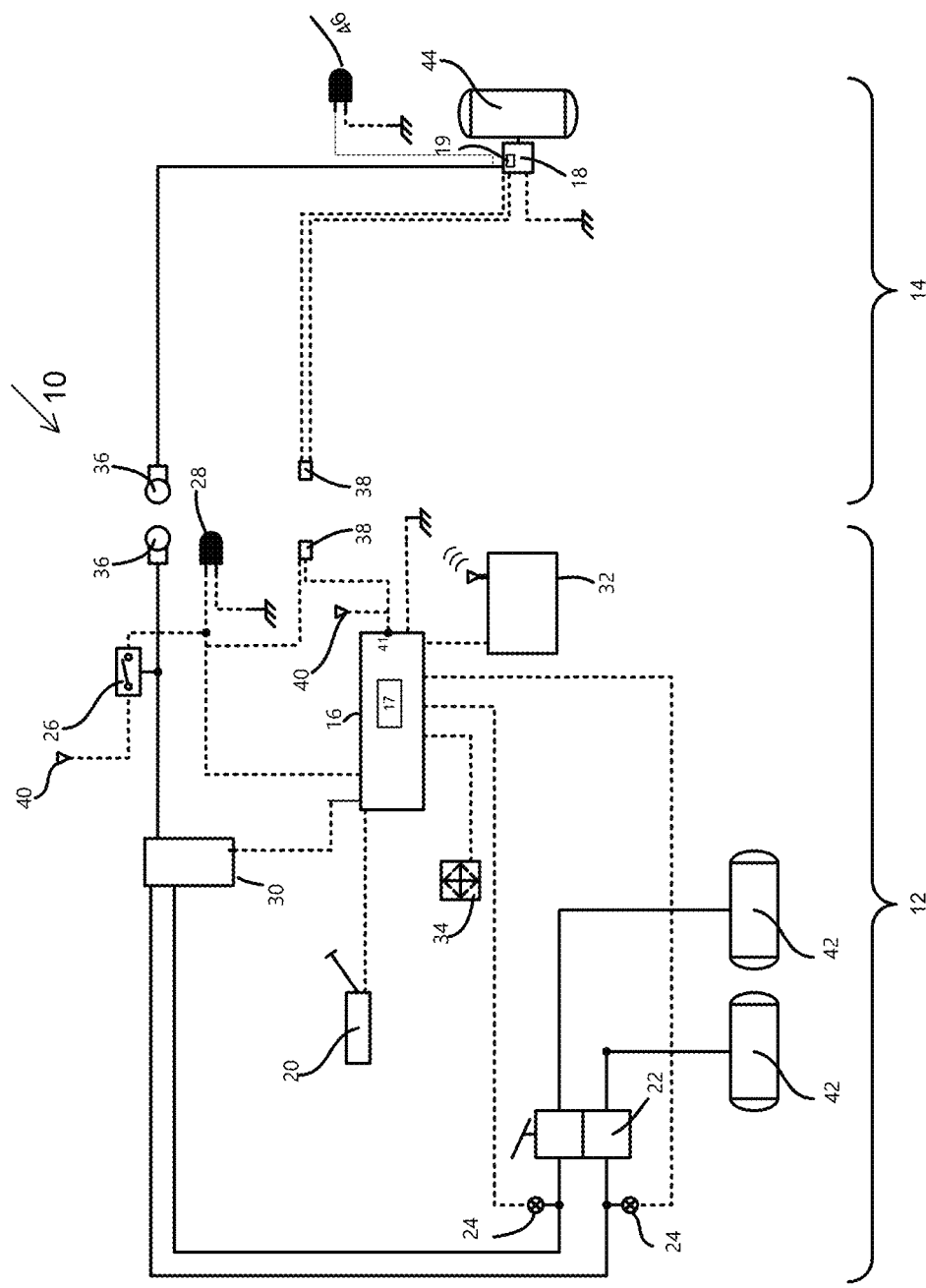
FIG. 1 illustrates a tractor-trailer braking system according to an example of this invention.

FIG. 1 illustrates a tractor-trailer braking system 10 according to an example of the present invention. The braking system 10 includes a tractor braking system 12 and a trailer braking system 14. The tractor braking system 12 is pneumatically coupled to the trailer braking system 14 through glad hands 36 and electrically coupled to the trailer braking system through electrical connectors 38.

The tractor braking system 12 includes reservoirs 42. The reservoirs 42 contain pressurized air for use in the tractor braking system 12.

The tractor braking system 12 includes a foot brake valve 22, which communicates pneumatically with the reservoirs 42. The driver depresses the foot brake valve 22 when he intends to apply the service brakes of the braking system 10. Air from the reservoirs 42 is delivered to various braking components (not shown) in order to slow down and stop the vehicle. Actuation of the foot brake valve 22 will apply the service brakes on both the tractor braking system 12 and the trailer braking system 14.

The tractor braking system 12 includes pressure sensors 24. The pressure sensors 24 may be coupled to the foot brake valve 22 to measure the pressure delivered by the foot brake valve 22 when the foot brake valve 22 is actuated. The pressure sensors 24 transmit signals indicative of a foot brake application.

The tractor braking system 12 includes an electronic trailer hand control device (TCE) 20. The driver manually actuates the TCE 20 when he intends to apply the service brakes of only the trailer braking system 14. The TCE 20 translates analog motion to a digital signal. The range of motion of the TCE 20 may be about ninety (90) degrees to allow for different gradations of braking to be requested. If only light braking is requested, the TCE 20 may be moved about ten (10) degrees. If full braking of the trailer service brakes is requested, the TCE 20 may be moved the full ninety (90) degrees. Some reasons to apply only the trailer service brake system 14 via the TCE 20 include to hold the trailer when the trailer is being coupled to the tractor and to assist preventing the vehicle from rolling backwards when stopped on a hill. In general, operation of the trailer service brakes only via the TCE 20 should be limited to zero or low speed maneuvers.

The tractor braking system 12 includes a tractor protection electropneumatic valve 30 that receives pressure from the foot brake valve 22 or a signal from a tractor controller 16 and transmits the service brake control pressure to the trailer braking system 14.

The tractor braking system 12 includes a stop lamp device 26. The stop lamp device 26 is coupled to the service brake delivery pressure delivered from the electropneumatic valve 30. The stop lamp device 26 is in electrical communication with a vehicle power supply 40 and chassis ground. The stop lamp device 26 powers a stop lamp 28 when the service brake pressure received at the stop lamp device 26 exceeds a predefined pressure value. In one example, the predefined pressure value is about four psi. Alternatively, the stop lamp 28 may be driven directly by a signal from the tractor controller 16.

The tractor braking system includes a yaw rate sensor and accelerometer, YAS 34. The YAS 34 measures the rate of acceleration or deceleration and the yaw moment of the vehicle and transmits signals to the tractor controller 16. The YAS 34 may be stand alone (as illustrated) or integrated with the tractor controller 16.

The tractor braking system 12 optionally includes a display device 32 to communicate the status of the tractor braking system 12 and trailer braking system 14 to the driver as well as any present warnings. The display device 32 may be a lamp, indicator, audible device or a display in the cab of the tractor. Display device 32 may also communicate vehicle information to a remote location via wireless communication, such that a fleet manager will receive information about the status of the tractor braking system 12 and trailer braking system 14. The tractor controller 16 includes an output to control the display device 32 or may communicate with the display via a serial communications bus. Additionally, a haptic device may be coupled to the seat or steering wheel to provide the driver with haptic feedback when there is a problem with the tractor or trailer braking system.

The tractor controller 16 includes at least one input to receive signals indicative of a foot brake application from the pressure sensors 24. The tractor controller 16 also includes an input to receive an electronic signal from the TCE 20. The signal may represent the degree of actuation and duration of actuation desired for the trailer service brakes.

The tractor controller 16 includes an input to receive signals from the stop lamp device 26. In another example, the tractor controller 16 receives signals indicative of trailer brake applications via power line carrier communications (PLC) from a trailer controller 18 via the electrical connectors 38. The tractor controller 16 includes another input for receiving signals indicative of automated brake applications, such as from the YAS 34.

The tractor controller 16 includes an output to control the electropneumatic valve 30. The tractor controller 16 will actuate the electropneumatic valve 30 in response to signals from the pressure sensors 24 or when an automated brake application is requested.

The tractor controller 16 includes control logic 17. The control logic 17 receives signals from the pressure sensors 24, the YAS 34, the stop lamp switch 26 and the TCE 20 in order to control and monitor the trailer brake system 14. The control logic 17 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 17. The tractor controller 16 may control the anti-lock braking and automated braking features, such as electronic stability control and advanced cruise control with braking, of the tractor braking system 12.

The control logic 17 includes a timer. The timer may be used for timing the length of the application of the TCE 20.

The control logic 17 is capable of determining and recording trailer brake applications by comparing the requests for braking of the trailer with the actual braking of the tractor. The control logic 17 will also compare the requested braking of the trailer to predetermined time periods.

The trailer braking system 14 includes reservoir 44, which contains pressurized air for use in the trailer braking system 14. Air from the reservoir 44 is delivered to other braking components (not shown) in order to brake the trailer in response to a service brake pressure received via gladhands 36 from the electropneumatic valve 30 or in response to an automated braking request.

The trailer braking system 14 includes a trailer controller 18. The trailer controller 18 receives vehicle power and a stop lamp signal via the electrical connectors 38. The trailer controller 18 may include an integral pressure sensor 19 to measure the pressure value of the service brake pressure received at the trailer controller 18. Both the stop lamp signal and the pressure value are indicators of a trailer brake application. The trailer controller 18 may use PLC or other protocol to communicate with the tractor controller 16 via the electrical connectors 38.

The trailer controller 18 is coupled to the service brake delivery pressure delivered from the gladhand 36. Alternatively, the stop lamp 28 may be driven directly by a signal from the trailer controller 18.

The trailer controller 18 and the tractor controller 16 communicate to provide the features of the present invention.

Therefore, a tractor controller for controlling trailer brake applications comprises an input for receiving a signal indicative of a trailer brake application and control logic. The control logic receives a signal indicating a trailer brake application is requested, compares the trailer brake signal to a predetermined signal profile, applies the trailer service brakes in response to the trailer brake signal meeting the signal profile and compares a duration of the trailer brake signal to first predetermined time. A warning is provided in response to the duration of the trailer brake signal being greater than a first predetermined time and the control logic discontinues the trailer service brake application in response to duration of trailer brake signal being greater than the second predetermined time.

Figure 2:
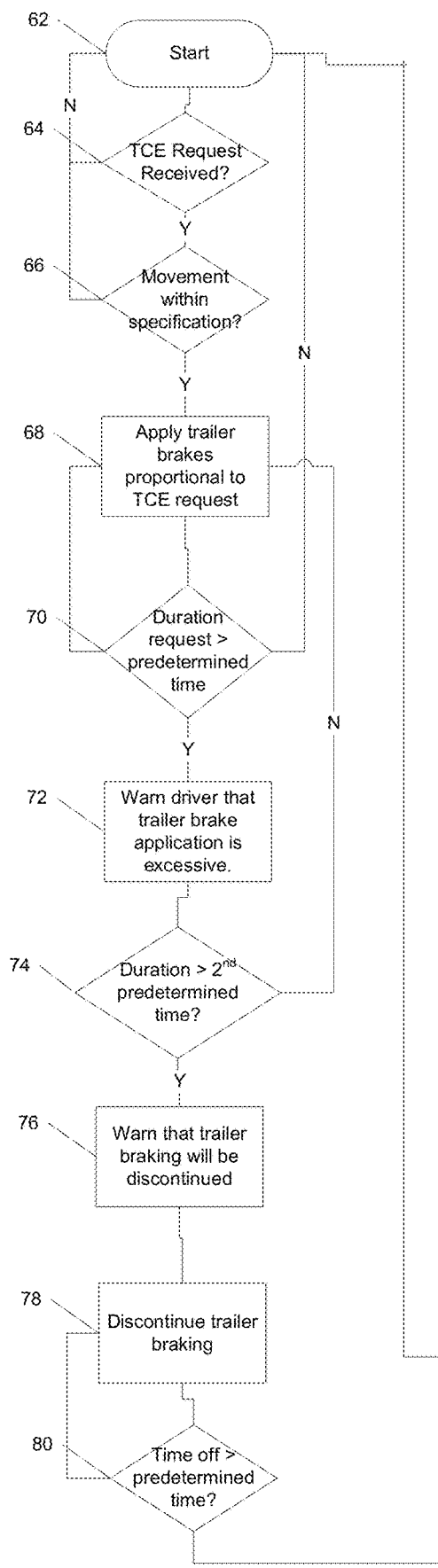
FIG. 2 illustrates a flow chart for a method of controlling trailer service brake applications according to an example of this invention.

A method 60 of controlling trailer brake applications is illustrated in FIG. 2. The method 60 begins in step 62.

In step 64, the control logic 17 receives a signal indicative of a requested trailer brake application from the TCE 20. The signal indicates that the TCE 20 has been moved.

Figure 3A:
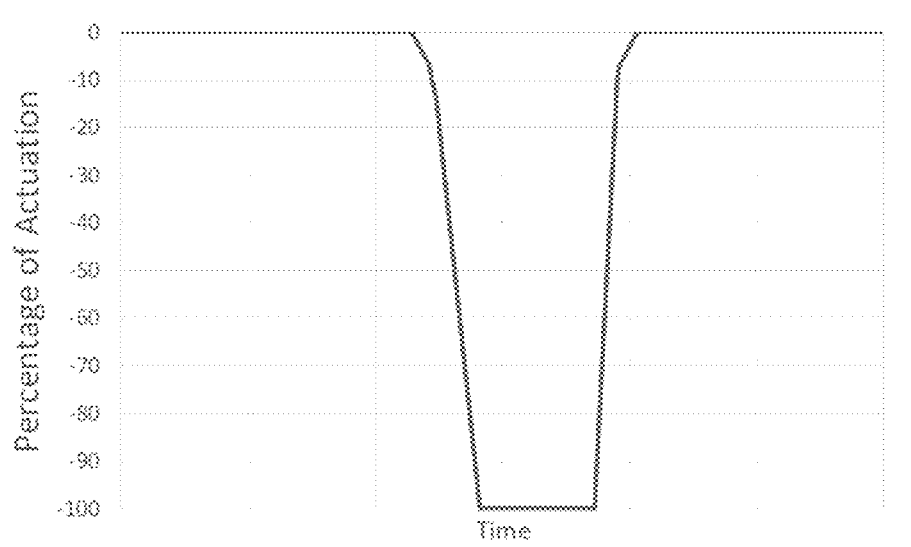
FIGS. 3A-D illustrate example outputs of an electronic trailer hand control device.

In step 66, the movement of the TCE 20 is compared to a plausible movement to ensure that the driver is requesting a trailer brake activation rather than the signal being caused by an inadvertent movement of the TCE 20. FIG. 3A shows an example of a plausible signal from the TCE 20 when it is actuated and then released by the driver.

Figure 3B:
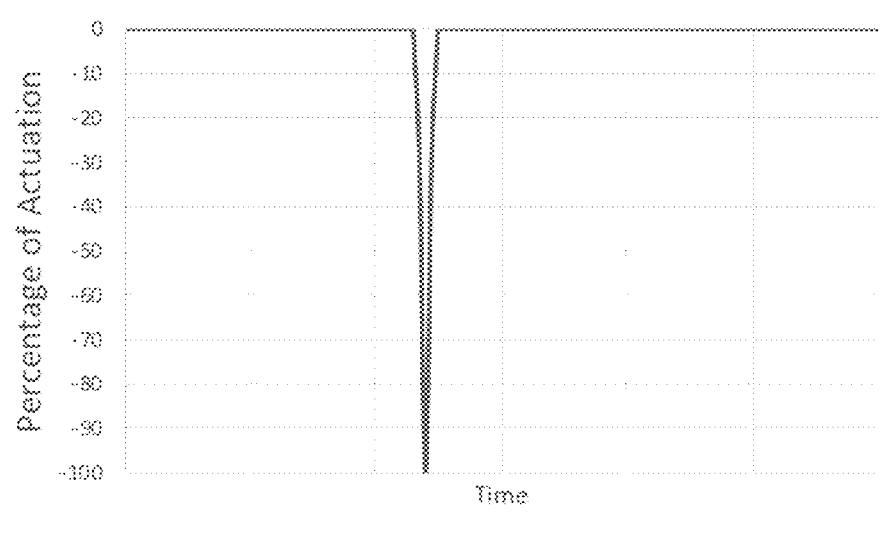
Figure 3C:
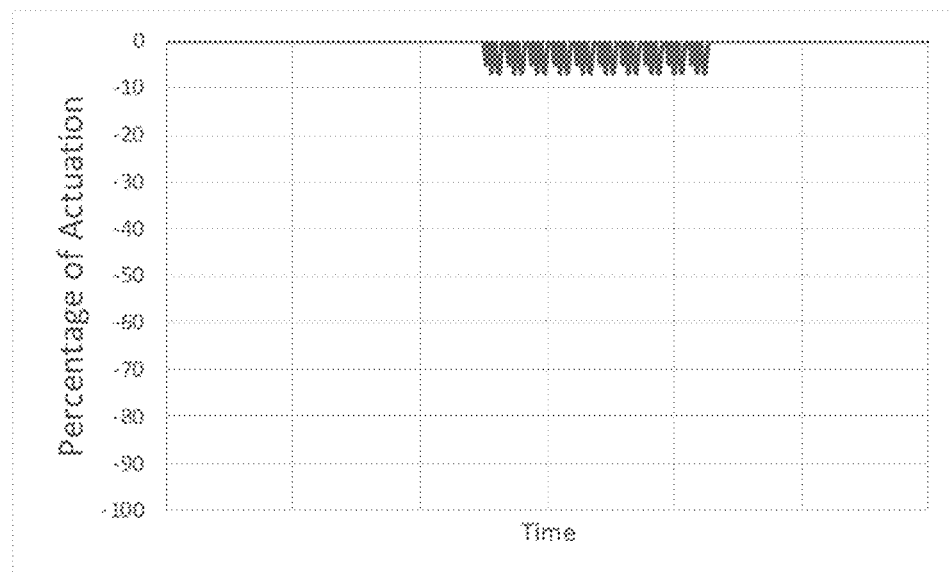

The time of the signal can be measured. If the movement was too rapid, for example, the TCE 20 was moved and returned to the origin point within 0.5 milliseconds, the method 60 will return to step 64 to wait for another movement of the TCE 20. FIG. 3B shows an example of a signal from the TCE 20 when it may have been accidentally moved by the driver. In another example, FIG. 3C shows a noisy signal from the TCE 20. No action would be taken by the control logic 17 in response to a noisy signal or one that was determined to be an accidental movement of the TCE 20.

In step 68, when the TCE 20 movement does meet the plausibility analysis, the trailer service brakes are applied in proportion to the request using the electropneumatic valve 30. For example, if the TCE 20 is moved to about half of its full range of motion, then about 50% of the available trailer service brake pressure will be applied via electropneumatic valve 30.

In step 70, the duration of the activation of the TCE 20 is compared to a first predetermined time. In one example, the first predetermined time is the same as the duration of the activation of the tractor service brake via the foot brake pedal 22. In another example, the duration is between about thirty (30) seconds and one minute. If the duration is the same or less than the first predetermined time, then the method 60 returns to step 68 to continue to apply the trailer brakes.

Figure 3D:
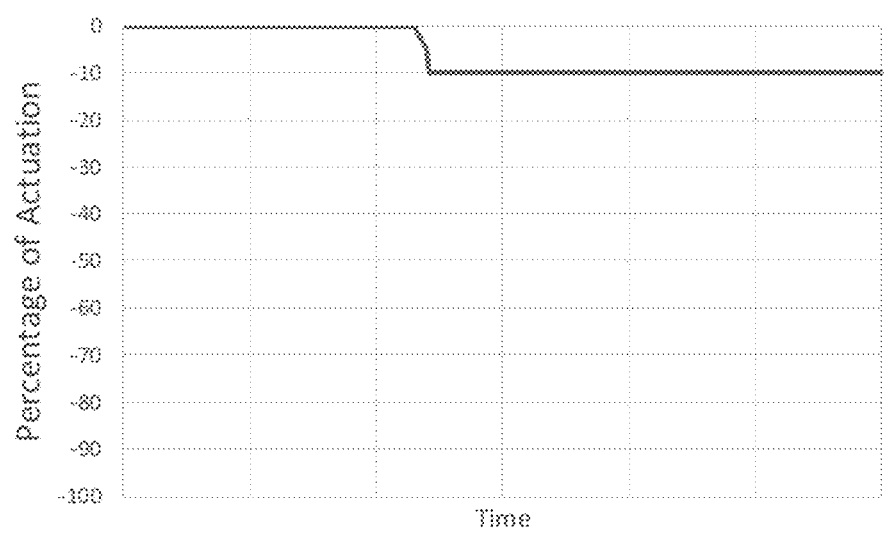

FIG. 3D shows an example of a signal from the TCE 20 when an object may be hanging on the hand control portion and causing it to remain in an activated state for a long duration. If the duration is longer than the first predetermined time, the method continues to step 72.

In step 72, the control logic 17 determines that the braking of the trailer is excessive as the time the trailer brakes have been activated is longer than the predetermined time. The indication of the excessive use of the trailer service brakes may be indicated to the driver or fleet manager via the display device 32. In this manner, both the driver and fleet manager will know that the driver has actuated the trailer brakes without actuating the tractor brakes, which is undesirable. The driver can modify his behavior or the fleet manager can take action as appropriate.

Generally, fleet managers want to minimize excessive wear on trailer brakes. An independent driver may think he is preserving life of the tractor brakes by only using the trailer hand control device to apply the trailer service brakes independent of the tractor service brakes, but he may be unaware of safety issues related to this practice. In addition, the trailer braking system 14 will wear prior to the tractor braking system 12.

In step 74 the control logic 17 compares the duration of activation of the TCE 20 to a second predetermined time. The second predetermined time may be about two minutes. If the duration is less than or the same as the second predetermined time, the method 60 returns to step 68 to continue trailer brake proportional to the driver request.

If the duration is greater than the second predetermined time, the method 60 continues to step 76 to indicate to the driver that the trailer service braking will be discontinued. The indication of the discontinuation of the trailer service brakes may be indicated to the driver or fleet manager via the display device 32. The driver still has full use of the trailer service brakes through depressing the foot brake in the tractor. The driver should actuate the foot brake valve in response to the warning if he wants to continue the activate the service brakes. In step 78, the trailer service braking is discontinued. The driver must reset the TCE 20 to the zero or neutral position before the tractor controller 16 will respond to another signal from the TCE 20.

In step 80, the time that the TCE 20 is in the zero or neutral position is measured against a third predetermined time to ensure that the TCE 20 has been reset and the trailer service brakes are no longer under the control of the TCE 20. In one example the third predetermined time is about (thirty) 30 seconds. If the time since the TCE 20 was released is less than or equal to the third predetermined time, the method 60 returns to step 78 to maintain the trailer service brakes as off. If the time since the TCE 20 was released is greater than the third predetermined time, the method returns to step 62.

In another example of the present invention, the tractor controller 16 may begin modified braking. One modification may include automatically increasing the tractor service braking to match the requested trailer service braking. Another modification may be to limit the trailer service braking via the electropneumatic valve 30 to a lower percentage of the available braking power. The method 60 can also determine when there is an invalid input from the TCE 20, such as if the vehicle keeps accelerating as sensed by the YAS 34 even though there is a request for trailer service brake activation from the TCE 20.

The method 60 may also serve as a prognostic indicator of trailer brake wear. The tractor braking system 12 and trailer braking system 14 will experience more uniform wear if the driver is made aware of potential overuse of the TCE 20.

Therefore, method 60 monitors the use of the trailer brakes while monitoring the use of the tractor brakes to ensure the trailer brakes are not being used excessively. This method 60 may prevent premature wear of the trailer brakes through awareness of driver braking behavior.

Therefore, a method for controlling trailer brake applications comprises receiving a signal indicative of a trailer brake application request at a tractor controller, comparing the trailer brake signal to a plausible signal profile and applying the trailer service brakes in response to the trailer brake signal meeting the plausible signal profile. The method also includes comparing a duration of the trailer brake signal to first predetermined time and discontinuing the trailer service brake application in response to duration of trailer brake signal being greater than a second predetermined time.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A tractor controller for controlling trailer brake applications on a tractor-trailer vehicle comprising:
  an input for receiving a signal indicative of a trailer brake application;
  control logic, the control logic capable of:
    receiving a signal indicating a trailer brake application is requested;
    comparing the trailer brake signal to a predetermined signal profile;
    applying the trailer service brakes in response to the trailer brake signal meeting the signal profile;
    comparing a duration of the trailer brake signal to a first predetermined time;

providing a warning in response to the duration of the trailer brake signal being greater than the first predetermined time; and discontinuing the trailer service brake application in response to duration of trailer brake signal being greater than a second predetermined time.

2. The tractor controller as in claim 1, the control logic further capable of transmitting a warning regarding the discontinuation of the trailer service brake application to at least one of a driver of the vehicle and a fleet manager.

3. The tractor controller as in claim 1, wherein the warning is one of a visual, haptic or audible warning.

4. The tractor controller as in claim 1, wherein the first predetermined time is between about thirty seconds and one minute and the second predetermined time is about two minutes.

5. The tractor controller as in claim 1, wherein the tractor controller does not apply the trailer service brakes until a predetermined time after a prior trailer brake application signal has ceased.

6. A method for controlling trailer brake applications comprising:

receiving a signal indicative of a trailer brake application request at a tractor controller;

comparing the trailer brake signal to a plausible signal profile;

applying the trailer service brakes in response to the trailer brake signal meeting the plausible signal profile;

comparing a duration of the trailer brake signal to a first predetermined time; and discontinuing the trailer service brake application in response to duration of trailer brake signal being greater than a second predetermined time.

7. The method as in claim 6, further comprising indicating the discontinuation of the trailer service brake application to at least one of a driver of a vehicle and a fleet manager.

8. The method as in claim 6, further comprising applying the trailer service brakes in proportion to the trailer brake signal.

9. The method as in claim 6, wherein the first predetermined time is about 30 seconds to one minute and the second predetermined time is about two minutes.

10. A system for controlling trailer brake applications comprising:

an electronic trailer hand control device; and a tractor controller, wherein the tractor controller includes:

an input for receiving a signal from the electronic trailer hand control device;

control logic, the control logic capable of:

receiving a signal indicating a trailer brake application is requested;

comparing the trailer brake signal to a plausible signal profile;

applying the trailer service brakes in response to the trailer brake signal meeting the plausible signal profile;

compare a duration of the trailer brake signal to a first predetermined time; and discontinue the trailer service brake application in response to duration of trailer brake signal being greater than a second predetermined time.

* * * * *